(12) United States Patent
Schilling

(10) Patent No.: US 7,716,914 B2
(45) Date of Patent: May 18, 2010

(54) TURBOFAN ENGINE ASSEMBLY AND METHOD OF ASSEMBLING SAME

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 817 days.

(21) Appl. No.: 11/614,585

(22) Filed: Dec. 21, 2006

(65) Prior Publication Data

US 2008/0148707 A1    Jun. 26, 2008

(51) Int. Cl.
*F02K 3/00* (2006.01)

(52) U.S. Cl. .................................... 60/268; 60/39.162

(58) Field of Classification Search ............... 60/226.1, 60/262, 268, 39.162; 415/174.4, 9; 416/2
See application file for complete search history.

(56) References Cited

U.S. PATENT DOCUMENTS

| | | | | |
|---|---|---|---|---|
| 3,673,802 | A * | 7/1972 | Krebs et al. | 60/226.1 |
| 3,729,957 | A * | 5/1973 | Petrie et al. | 60/226.1 |
| 3,830,058 | A * | 8/1974 | Ainsworth | 60/226.1 |
| 4,005,575 | A * | 2/1977 | Scott et al. | 60/226.1 |
| 4,251,987 | A * | 2/1981 | Adamson | 60/805 |
| 4,751,816 | A * | 6/1988 | Perry | 60/226.1 |
| 4,790,133 | A | 12/1988 | Stuart | |
| 4,916,894 | A * | 4/1990 | Adamson et al. | 60/226.1 |
| 4,969,325 | A * | 11/1990 | Adamson et al. | 60/226.1 |
| 5,010,729 | A * | 4/1991 | Adamson et al. | 60/226.1 |
| 5,079,916 | A | 1/1992 | Johnson | |
| 6,339,927 | B1 | 1/2002 | DiPietro, Jr. | |
| 6,381,948 | B1 * | 5/2002 | Klingels | 60/226.1 |
| 6,619,030 | B1 | 9/2003 | Seda et al. | |
| 6,622,473 | B2 * | 9/2003 | Becquerelle et al. | 60/226.1 |

(Continued)

FOREIGN PATENT DOCUMENTS

EP    0558769 A1    9/1993

(Continued)

OTHER PUBLICATIONS

Anthony L. DiPietro, Jr., Integrated Fan-Core Twin Spool Counter-Rotatting Turbofan Gas Turbine Engine, Jul. 2, 2002.

(Continued)

*Primary Examiner*—William H Rodriguez
(74) *Attorney, Agent, or Firm*—William Scott Andes, Esq.; Armstrong Teasdale LLP

(57) ABSTRACT

A turbofan engine assembly includes a core gas turbine engine including a high-pressure compressor, a combustor disposed downstream from the high-pressure compressor, and a high-pressure turbine coupled to the high-pressure compressor using a shaft, counter-rotating booster compressor coupled to the core gas turbine engine, the counter-rotating booster compressor comprising a first rotor section configured to rotate in a first direction and a second rotor section configured to rotate in an opposite second direction, a single stage fan assembly coupled to the first rotor section, a drive shaft coupled between the low-pressure turbine and the fan assembly, and a gearbox coupled between the drive shaft and the second rotor section such that the low-pressure turbine drives the gearbox and such that the gearbox drives the second rotor section. A method of assembling the above turbofan engine assembly is also described herein.

20 Claims, 4 Drawing Sheets

U.S. PATENT DOCUMENTS

| | | |
|---|---|---|
| 6,684,626 B1 | 2/2004 | Orlando et al. |
| 6,711,887 B2 | 3/2004 | Orlando et al. |
| 6,732,502 B2 | 5/2004 | Seda et al. |
| 6,763,652 B2 | 7/2004 | Baughman et al. |
| 6,763,653 B2 | 7/2004 | Orlando et al. |
| 6,763,654 B2 | 7/2004 | Orlando et al. |
| 7,490,460 B2* | 2/2009 | Moniz et al. ............ 60/268 |
| 7,493,753 B2* | 2/2009 | Moniz et al. ............ 60/268 |
| 7,493,754 B2* | 2/2009 | Moniz et al. ............ 60/268 |

FOREIGN PATENT DOCUMENTS

GB    2198791 A    6/1988

OTHER PUBLICATIONS

European Patent Office, European Search Report for Patent No. 1939430, Dec. 22, 2009, 7 pages.

* cited by examiner

TURBOFAN ENGINE ASSEMBLY AND METHOD OF ASSEMBLING SAME

BACKGROUND OF THE INVENTION

This invention relates generally to gas turbine engines, and more specifically to a turbofan engine assembly that includes a counter-rotating booster compressor.

At least some known turbofan engine assemblies include a fan assembly, a core gas turbine engine, and a low-pressure or power turbine. The core gas turbine engine includes at least one compressor, a combustor, and a high-pressure turbine that are coupled together in a serial flow relationship. Moreover, at least one known turbofan engine assembly includes a booster that is disposed between the fan assembly and the core gas turbine engine.

To improve the efficiency of the turbofan engine assembly, it is desirable to operate the fan assembly at a relatively low speed to improve fan efficiency and to operate the low-pressure turbine at a relatively high speed to improve the low-pressure turbine efficiency. However, to operate the fan assembly at a relatively slow speed, additional stages are added to the booster compressor. As a result, the length of the overall turbofan engine assembly is increased because of the additional booster stages. Moreover, the fan assembly is moved further away from the existing mounting system. As a result, the stiffness of the fan case structure and the fan frame must be increased, and additional bearings or structure may be installed to maintain stiffness driving performance and operational clearances. As such, the additional booster stages increase the overall cost, weight, and design complexity of the turbofan engine assembly.

BRIEF DESCRIPTION OF THE INVENTION

In one aspect, a method of assembling a turbofan engine is provided. The method includes coupling a counter-rotating booster compressor to a fan assembly, the counter-rotating booster compressor including a first rotor section configured to rotate in a first direction and a second rotor section configured to rotate in an opposite second direction, coupling the first rotor section to a single stage fan assembly, coupling the second rotor section to a gearbox, coupling the single stage fan assembly to the a low-pressure turbine using a drive shaft, and coupling a gearbox between the drive shaft and the second rotor section such that the low-pressure turbine drives the gearbox and such that the gearbox drives the second rotor section.

In another aspect, a turbofan engine assembly is provided. The turbofan engine assembly includes a core gas turbine engine including a high-pressure compressor, a combustor disposed downstream from the high-pressure compressor, and a high-pressure turbine coupled to the high-pressure compressor using a shaft, counter-rotating booster compressor coupled to the core gas turbine engine, the counter-rotating booster compressor comprising a first rotor section configured to rotate in a first direction and a second rotor section configured to rotate in an opposite second direction, a single stage fan assembly coupled to the first rotor section, a drive shaft coupled between the low-pressure turbine and the fan assembly, and a gearbox coupled between the drive shaft and the second rotor section such that the low-pressure turbine drives the gearbox and such that the gearbox drives the second rotor section.

DETAILED DESCRIPTION OF THE INVENTION

Figure 1:
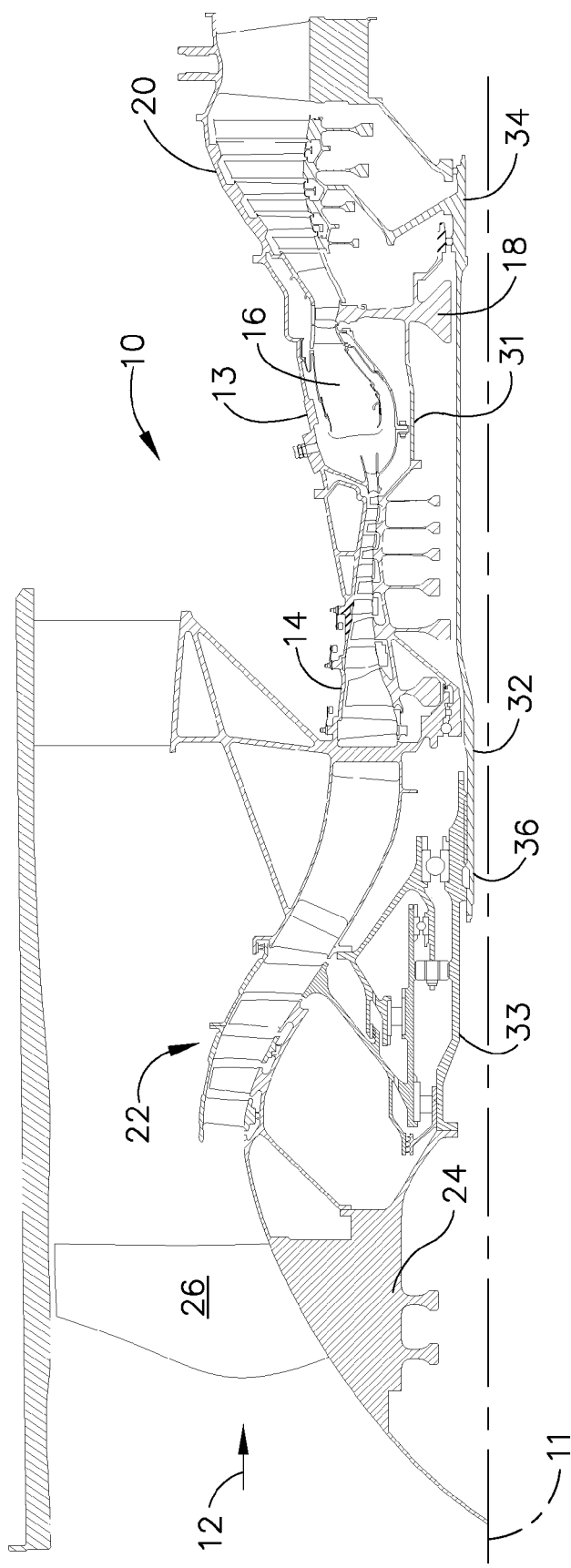
FIG. 1 is a cross-sectional view of a portion of an exemplary turbofan engine assembly that includes a counter-rotating booster compressor.

FIG. 1 is a schematic illustration of an exemplary turbofan engine assembly 10 having a longitudinal axis 11. Turbofan engine assembly 10 includes a fan assembly 12, a core gas turbine engine 13 that is disposed downstream from fan assembly 12, and a single-rotation low-pressure turbine 20 that is disposed downstream from the core gas turbine engine. The core gas turbine engine 13 includes a high-pressure compressor 14, a combustor 16 that is disposed downstream from high-pressure compressor 14, a high-pressure turbine 18 that is disposed downstream from combustor 16, and a first drive shaft 31 that is coupled between high-pressure compressor 14 and high-pressure turbine 18. In the exemplary embodiment, turbofan engine assembly 10 also includes a multi-stage counter-rotating booster compressor 22 that is disposed downstream from fan assembly 12 and upstream from core gas turbine engine 13.

In the exemplary embodiment, fan assembly 12 is a single rotation (SR) fan assembly that includes a single rotor disk 24 and a plurality of fan blades 26 that are coupled to rotor disk 24. Turbofan engine assembly 10 also include a second drive shaft 32 that includes a first end 34 that is coupled to low-pressure turbine 20 and a second end that 36 that is coupled to a shaft extension 33 that is used to drive both fan assembly 12 and counter-rotating booster 22, as will be discussed below.

Figure 2:
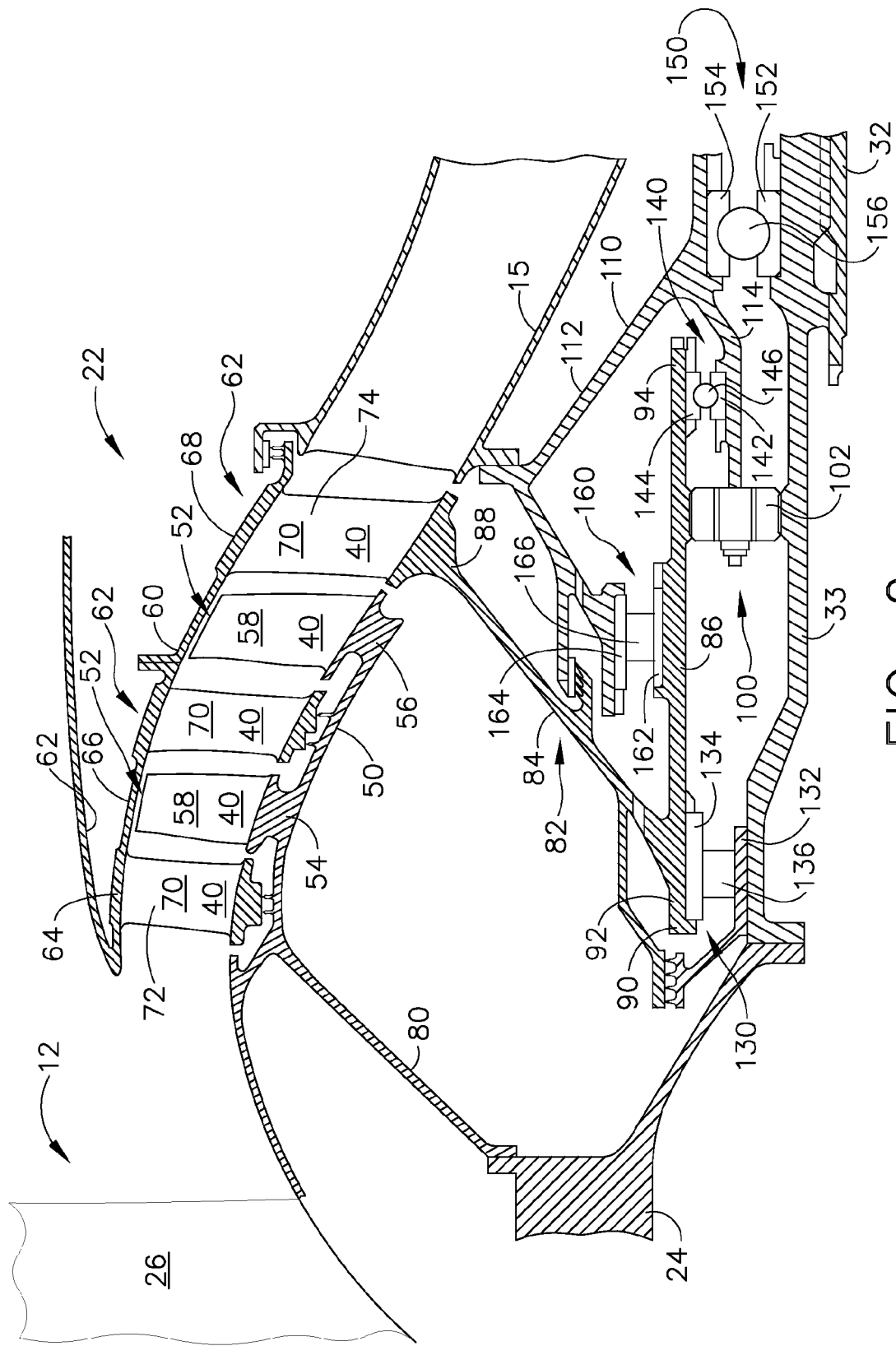
FIG. 2 is an enlarged cross-sectional view of the exemplary counter-rotating booster compressor shown in FIG. 1.

FIG. 2 is an enlarged cross-sectional view of an exemplary counter-rotating booster compressor arrangement that may be utilized with turbofan engine assembly 10, shown in FIG. 1. In this arrangement, counter-rotating booster compressor 22 includes five rotating stages 40. More specifically, counter-rotating booster compressor 22 includes a first rotor section or inner spool 50 that, in the exemplary embodiment, includes two rotor stages 52, wherein each stage includes a respective rotating disk 54 and 56, and a plurality of blades 58 that are coupled to each respective disk. Counter-rotating booster compressor 22 also includes a second rotor section or outer spool 60 that, in the exemplary embodiment, includes three stages 62, wherein each stage includes a respective rotating disk 64, 66, and 68, and a plurality of blades 70 that are coupled to each respective disk. As shown in FIG. 2, the inner rotor blades 58 are interdigitated with the outer rotor blades 70.

In the exemplary embodiment, a first stage 72 of second rotor section 60 functions as inlet guide vanes (IGV) to facilitate channeling airflow entering turbofan engine assembly 10 downstream through booster 22, and a fifth stage 74 of second rotor section 60 functions as outlet guide vanes (OGVs). Although booster compressor 22 is shown as having only five stages, it should be realized that booster compressor 22 may have any quantity of stages of counter-rotating rotor blades, or may include a stationary IGV or OGV depending on the inlet or exit swirl.

In this embodiment, first rotor section or inner spool 50 is coupled to fan assembly 12 utilizing a cone 80. More specifically, as shown in FIG. 2, fan assembly 12 is driven by low-pressure turbine 20 via shafts 32 and 33, and inner spool 50 is driven by fan assembly 12 via cone 80. As such, both fan assembly 12 and inner spool 50 rotate in the same rotational direction and at the same rotational speed as low-pressure turbine 20. Moreover, outer spool 60 is also driven by low-pressure turbine 20 via a gearbox 100. More specifically, outer spool 60 is coupled to gearbox 100 utilizing a cone 82. In this embodiment, cone 82 is substantially V-shaped and includes a first portion 84 and a second portion 86. In the exemplary embodiment, first and second portions 84 and 86 are fabricated to form a unitary cone 82. First portion 84 includes a first end 88 that is coupled to outer spool 60. Specifically, first end 88 is coupled to the fifth stage 74 of booster compressor 22 to drive outer spool 60. The second end 90 of first portion 84 is coupled to, or formed with, a first end 92 of second portion 86. A second end 94 of second portion 86 and first end 92 are each disposed radially outwardly from a plurality of bearing assemblies which provide radial support for cone 82, and thus also provide radial support to outer spool 60.

In the exemplary embodiment, gearbox 100 is disposed between cone 82 and extension shaft 33 to enable low-pressure turbine 20 to drive outer spool 60 in a rotational direction that is opposite to the rotational direction of low-pressure turbine 20. Moreover, and in the exemplary embodiment, gearbox 100 is configured to drive the outer spool 60 at a rotational speed that is less than the rotational speed of low-pressure turbine 20, and thus less than the rotational speed of fan assembly 12 and inner spool 50.

In the exemplary embodiment, gearbox 100 has a gear ratio of approximately 0.08 to 1 such that fan assembly 12 and inner spool 50 each rotate at a rotational speed that is approximately 1.2 times the rotational speed of outer spool 60. In another exemplary embodiment, gearbox 100 has a gear ratio such that fan assembly 12 and inner spool 50 each rotate at a rotational speed that is between approximately 1.05 and approximately 1.4 times faster than the rotational speed of outer spool 60.

In the exemplary embodiment, gearbox 100 is an epicyclic gearbox that includes a plurality of gears 102 that substantially circumscribe extension shaft 33. Turbofan engine assembly 10 also includes a substantially wishbone shaped support structure 110 that is utilized to mount gearbox 100 within turbofan engine assembly 10. More specifically, support structure 110 includes a first portion 112 that is coupled to a fan frame 15 at approximately the midpoint of first portion 112. Support structure 110 also includes a second portion 114 that is coupled to first portion 112. Second portion 114 is utilized to mount the plurality of gears 102 within turbofan engine assembly 10 and thus also maintains the plurality of gears 102 in a substantially fixed axial position around extension shaft 33.

More specifically, turbofan engine assembly 10 includes a first bearing assembly 130, that in the exemplary embodiment, is a differential bearing that is disposed between shaft extension 33 and cone 82 to provide rotational support for outer spool 60. More specifically, bearing assembly 130 includes a rotating inner race 132 that is coupled to shaft extension 33, and a rotating outer race 134 that is coupled to cone 82. First bearing assembly 130 also includes a plurality of roller bearings 136 that are disposed between inner and outer races 132 and 134. In operation, first bearing assembly 130 is utilized to provide radial support for outer spool 60 while still allowing low-pressure turbine 20 and outer spool 60 to rotate at different speeds.

Turbofan engine assembly 10 also includes a second bearing assembly 140, that in the exemplary embodiment, is a thrust bearing that is disposed between cone 82 and support structure 110. More specifically, bearing assembly 140 is disposed downstream from gearbox 100 and includes a stationary inner race 142 that is coupled to second portion 114 of support structure 110, and a rotating outer race 144 that is coupled to cone 82 proximate to second end 94. Second bearing assembly 140 also includes a plurality of bearing elements 146 that are disposed between inner and outer races 142 and 144. In operation, second bearing assembly 140 is utilized to substantially absorb the thrust loads generated by outer spool 60 and transmit any residual thrust loads to fan frame 15, via support structure 110.

Turbofan engine assembly 10 also includes a third bearing assembly 150, that in the exemplary embodiment, is a main thrust bearing that is disposed between low-pressure turbine drive shaft 32 and support structure 110. More specifically, bearing assembly 150 is disposed downstream from thrust bearing assembly 140 and includes a rotating inner race 152 that is coupled to drive shaft 32, a stationary outer race 154 that is coupled to support structure 110, and a plurality of bearing elements 156 that are disposed between inner and outer races 152 and 154. In operation, third bearing assembly 150 is utilized to substantially balance the thrust loads generated by low-pressure turbine 20, fan assembly 12, and inner spool 50, and transmit any residual thrust loads to fan frame 15, via support structure 110.

Turbofan engine assembly 10 also includes a fourth bearing assembly 160, that in the exemplary embodiment, is a roller bearing that is disposed between cone 82 and support structure 110 and upstream from gearbox 100. More specifically, bearing assembly 160 includes a rotating inner race 162 that is coupled to cone 82, and a stationary outer race 164 that is coupled to support structure 110, and a plurality of roller bearings 166 that are disposed between inner and outer races 162 and 164. In operation, fourth bearing assembly 130 is utilized to provide radial support for outer spool 60 while still allowing outer spool 60 to rotate freely with respect to support structure 110.

Figure 3:
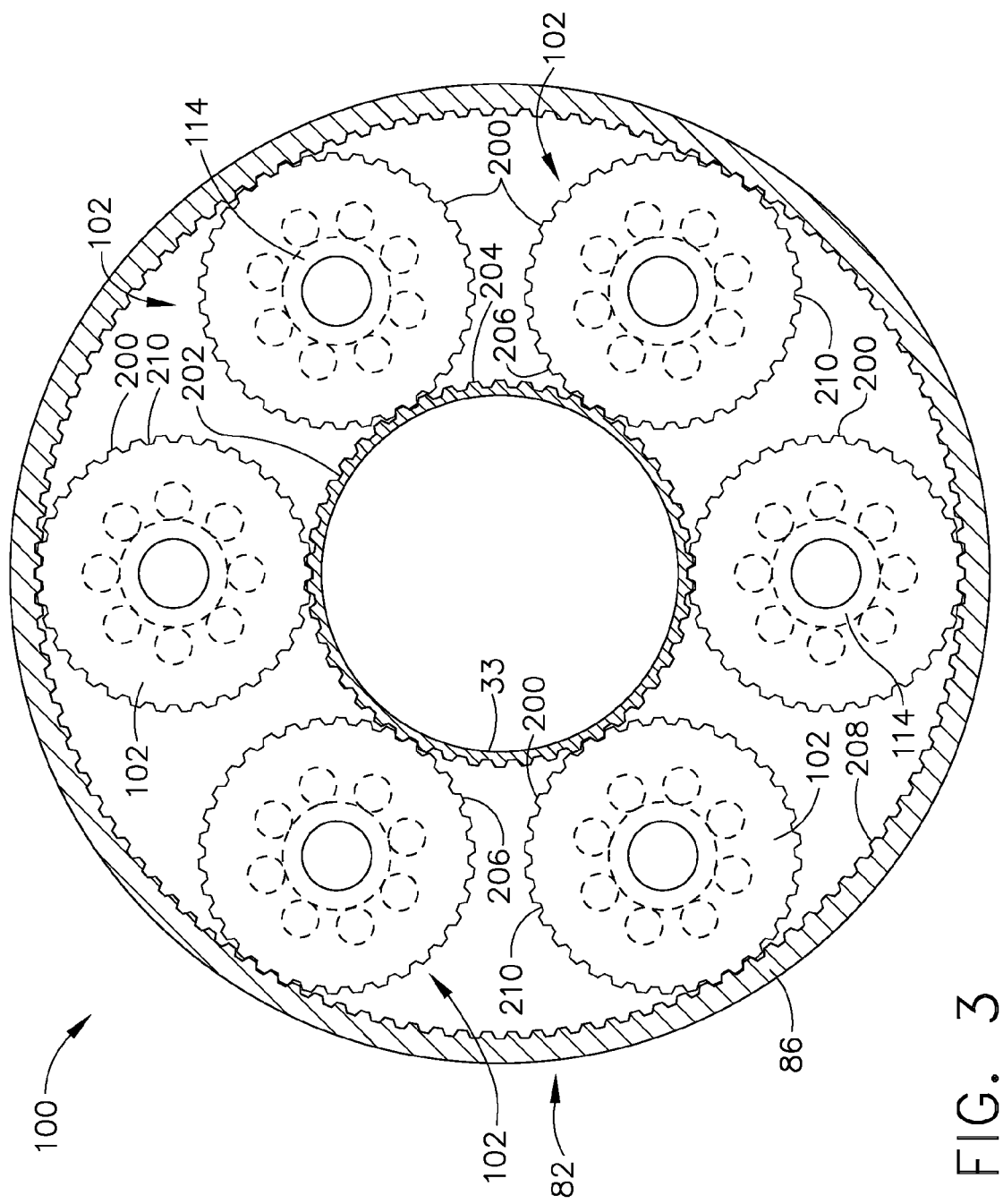
FIG. 3 is an end view of the gearbox shown in FIG. 2.

FIG. 3 is an end view of gearbox 100 shown in FIGS. 1 and 2. As shown in FIG. 3, each respective gear 102 includes a plurality of gear teeth 200 that are disposed circumferentially around an exterior surface of each respective gear 102. Moreover, drive shaft 33 includes a plurality of gear teeth 202 that are disposed circumferentially around an exterior surface of drive shaft extension 33 such that during assembly a radially inner surface 206 of each respective gear 102 is geared to, and thus driven by, low-pressure turbine shaft 32, through drive shaft 33. During assembly, gears 102 are coupled to second portion 114 of support structure 110. Moreover, a radially inner surface of cone 82 includes a plurality of gear teeth 208 disposed on a radially inner surface of second portion 86, and cone 82 is geared to a cylindrical outer surface 210 of gears 102, such that low-pressure turbine 20 drives gears 102 which in turn drive cone 82, and thus outer spool 60, in a rotational direction that is opposite to the rotational direction of low-pressure turbine 20.

Figure 4:
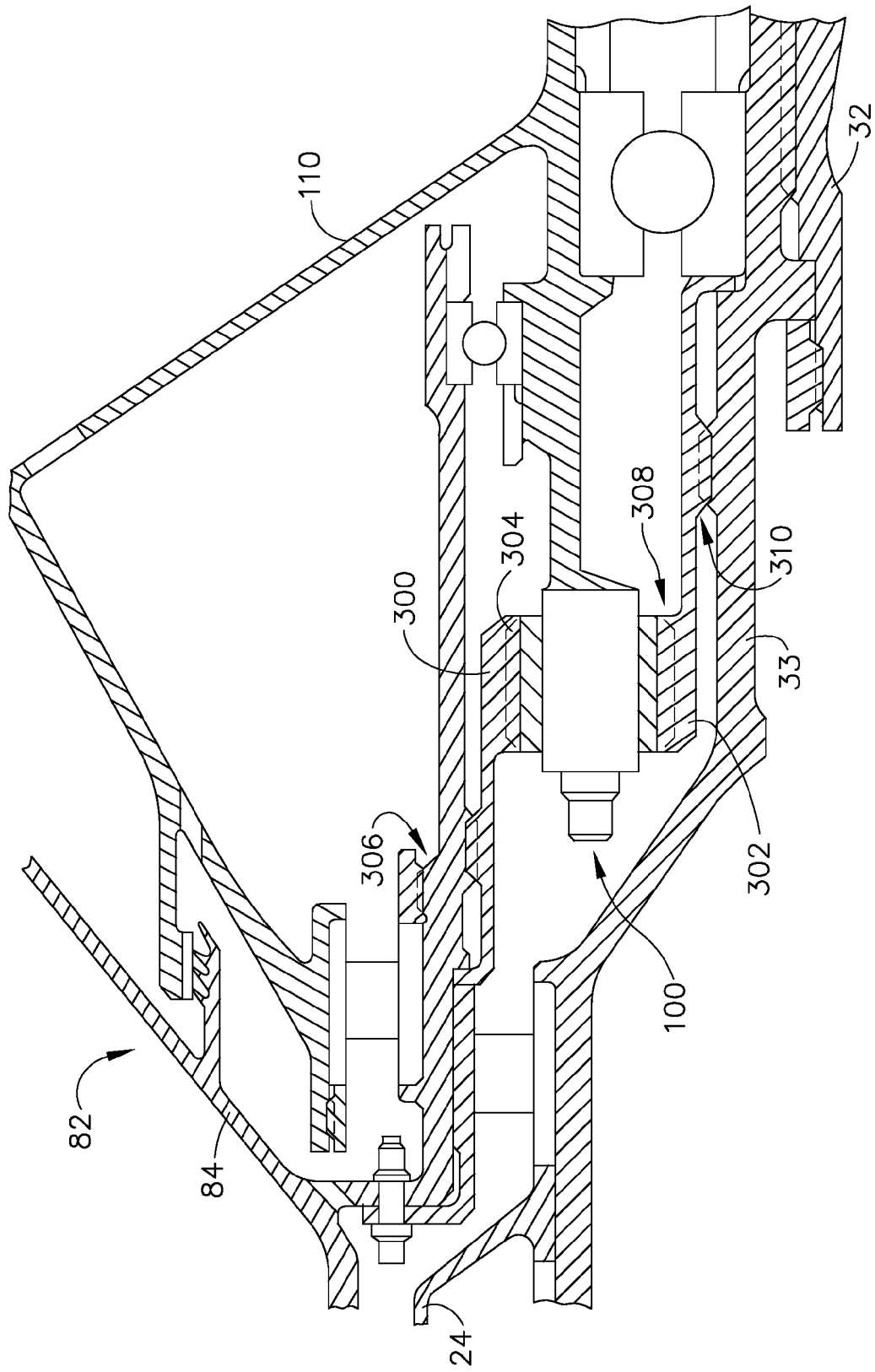
FIG. 4 is an end view of the gearbox shown in FIG. 2.

FIG. 4 is an enlarged cross-sectional view of an exemplary counter-rotating booster compressor arrangement that may be utilized with turbofan engine assembly 10, shown in FIG. 1. This arrangement is substantially similar to the arrangement shown in FIGS. 2 and 3, with the exception that turbofan engine assembly 10 also includes a first shaft extension 300 and a second shaft extension 302.

More specifically, as shown in FIGS. 2 and 3 gearbox 100 directly drives both shaft 33 and cone 82 via a plurality of gear teeth that are formed as part of both shaft 33 and cone 82. However, in this arrangement, shaft extension 300 includes a plurality of gear teeth 304 that are disposed on a radially inner surface of shaft extension 300 such that gearbox 100 meshes with gear teeth 304 and thus drives shaft extension 300. Moreover, shaft extension 300 also includes a plurality of splines 306 that are disposed on a radially outer surface of shaft extension 300 such that gearbox 100 drives cone 82 via shaft extension 300. Additionally, as shown in FIG. 4, shaft extension 302 includes a plurality of gear teeth 308 that are disposed on a radially outer surface of shaft extension 302 such that gearbox 100 meshes with gear teeth 308 and thus drives shaft extension 302. Moreover, shaft extension 302 also includes a plurality of splines 310 that are disposed on a radially inner surface of shaft extension 302 such that shaft 33 drive shaft extension 302 and thus drives gearbox 100. The arrangement shown in FIG. 4 facilitates reducing the time and cost to repair turbofan engine assembly 10 in the event of gear wear. More specifically, in the event that a disassembly occurs, gearbox 100 may more easily be removed or replaced by removing the shaft extensions 300 and 302 without first having to remove cone 82 and shaft 33 as shown in FIG. 3.

The turbofan engine assembly described herein includes a counter-rotating (CR) booster compressor that is coupled to an epicyclic gearbox to enable the speed of each rotor section of the booster compressor to be operated to achieve maximum engine efficiency. In this embodiment, the turbofan engine assembly includes a single stage fan that is driven directly by the low-pressure turbine. Moreover, the counter-rotating booster compressor includes an inner spool that is coupled to fan assembly and thus drive by the low-pressure turbine. Moreover, the counter-rotating booster compressor also includes an outer spool that is driven by the low-pressure turbine via an epicyclic gearbox. In this arrangement, the outer spool rotates in a direction that is opposite to the rotational direction of the fan assembly, the counter-rotating booster inner spool, and the low-pressure turbine. Moreover, by varying the gearbox ratio, the outer spool may rotate at a rotational speed that is different than the rotational speed of the inner spool thus improving overall engine efficiency. More specifically, the counter rotating booster has stages 2 and 4 rotating at the same speed as the fan assembly, whiles stages, 1, 3, and 5 counter rotate with a speed that can be higher than the fan speed. This arrangement allows a substantial pressure rise to occur in the booster compressor utilizing a relatively few number of stages.

The turbofan engine assembly described herein turns the stator cascade into a rotating cascade thereby producing increased pressure. By changing the stators into rotating blades, the required pressure can be developed in half the number of airfoil cascades. This arrangement reduces not only the stage count but also reduces the length of all structures between the fan and engine mount. As a result, the overall weight of the turbo fan engine is reduced, the fan case length is reduced, the nacelle length is reduced, extra stiffening for the fan frame is not required thus reducing overall weight, ice accumulation in the former booster stator, now the counter-rotating booster, is reduced, all while utilizing a simple relatively low horsepower epicyclic gearbox to drive a portion of the counter-rotating booster compressor.

A method to assemble the turbofan engine assembly described herein includes coupling a counter-rotating booster compressor to a core gas turbine engine, the counter-rotating booster compressor including a first rotor section configured to rotate in a first direction and a second rotor section configured to rotate in an opposite second direction, coupling the first rotor section to a single stage fan assembly, coupling the second rotor section to a gearbox, coupling the single stage fan assembly to a low-pressure turbine using a drive shaft, and coupling a gearbox between the drive shaft and the second rotor section such that the low-pressure turbine drives the gearbox and such that the gearbox drives the second rotor section.

While the invention has been described in terms of various specific embodiments, those skilled in the art will recognize that the invention can be practiced with modification within the spirit and scope of the claims.

What is claimed is:

1. A method of assembling a turbofan engine assembly comprises:
   coupling a counter-rotating booster compressor upstream from a core gas turbine engine, the counter-rotating booster compressor including a first rotor section configured to rotate in a first direction and a second rotor section configured to rotate in an opposite second direction;
   coupling the first rotor section to a single stage fan assembly;
   coupling the second rotor section to a gearbox;
   coupling the single stage fan assembly to the a low-pressure turbine using a drive shaft; and
   coupling a gearbox between the drive shaft and the second rotor section such that the low-pressure turbine drives the gearbox and such that the gearbox drives the second rotor section.

2. A method in accordance with claim 1, further comprising:
   coupling a drive shaft to the low-pressure turbine; and
   coupling the gearbox between the drive shaft and the second rotor section such that the second rotor section rotates at a rotational speed that is different than the rotational speed of the low-pressure turbine.

3. A method in accordance with claim 1, further comprising:
   coupling a support structure to a fan frame; and
   coupling the gearbox to the support structure.

4. A method in accordance with claim 3, further comprising:
   coupling the second rotor section to the gearbox using a cone; and
   mounting a first roller bearing assembly to a radially outer surface of the cone such that the first roller bearing assembly in disposed between the cone and the support structure.

5. A method in accordance with claim 4, further comprising mounting a first thrust bearing assembly to a radially inner surface of the cone such that the first thrust bearing assembly in disposed downstream from the gearbox between the cone and the support structure.

6. A method in accordance with claim 4, further comprising:
   coupling a drive shaft extension between the drive shaft and the fan assembly; and
   mounting a second thrust bearing assembly to a radially inner surface of the support structure such that the second thrust bearing assembly is disposed downstream from the gearbox between the support structure and the drive shaft extension.

7. A method in accordance with claim 6, further comprising mounting a second roller bearing assembly to a radially outer surface of the drive shaft extension such that the second roller bearing assembly is disposed upstream from the gearbox between the drive shaft extension and the cone.

8. A method in accordance with claim 1, further comprising coupling an epicyclic gearbox having a substantially toroidal cross-sectional profile to the drive shaft such that the gearbox substantially circumscribes the drive shaft.

9. A method in accordance with claim 1, further comprising coupling a first shaft extension between the gearbox and the second rotor assembly such that a first end of the first shaft extension is splined to a cone driving the second rotor assembly and such that a second end of the first shaft extension is splined to the gearbox.

10. A method in accordance with claim 1, further comprising coupling a second shaft extension between the gearbox and the fan assembly such that a first end of the second shaft extension is geared to the gearbox and such that a second end of the second shaft extension is geared to a drive shaft extension coupled between the drive shaft and the fan assembly.

11. A turbofan engine assembly comprising:
a core gas turbine engine including a high-pressure compressor, a combustor disposed downstream from said high-pressure compressor, and a high-pressure turbine coupled to said high-pressure compressor using a shaft;
counter-rotating booster compressor coupled to said core gas turbine engine, said counter-rotating booster compressor comprising a first rotor section configured to rotate in a first direction and a second rotor section configured to rotate in an opposite second direction;
a single stage fan assembly coupled to said first rotor section; a
drive shaft coupled between a low-pressure turbine and said fan assembly; and
a gearbox coupled between said drive shaft and said second rotor section such that said low-pressure turbine drives said gearbox and such that said gearbox drives said second rotor section.

12. A turbofan engine assembly in accordance with claim 11, wherein said gearbox comprises a plurality of gears, said plurality of gears configured to drive said second rotor section at a rotational speed that is different than a rotational speed of said low-pressure turbine.

13. A turbofan engine assembly in accordance with claim 11, further comprising a support structure coupled to a fan frame, said gearbox coupled to said support structure.

14. A turbofan engine assembly in accordance with claim 13, further comprising:

a cone coupled between said gearbox and said second rotor section; and
a first roller bearing assembly mounted to a radially outer surface of said cone such that said first roller bearing assembly in disposed between said cone and said support structure.

15. A turbofan engine assembly in accordance with claim 14, further comprising a first thrust bearing assembly mounted to a radially inner surface of said cone such that said first thrust bearing assembly in disposed downstream from said gearbox between said cone and said support structure.

16. A turbofan engine assembly in accordance with claim 14, further comprising:
a drive shaft extension coupled between said drive shaft and said fan assembly; and
a second thrust bearing assembly mounted to a radially inner surface of said support structure such that said second thrust bearing assembly is disposed downstream from said gearbox between said support structure and said drive shaft extension.

17. A turbofan engine assembly in accordance with claim 16, further comprising a second roller bearing assembly mounted to a radially outer surface of said drive shaft extension such that said second roller bearing assembly is disposed upstream from said gearbox between said drive shaft extension and said cone.

18. A turbofan engine assembly in accordance with claim 11, wherein said gearbox comprises an epicyclic gearbox having a substantially toroidal cross-sectional profile, said gearbox substantially circumscribes said drive shaft.

19. A turbofan engine assembly in accordance with claim 11 further comprising a first shaft extension coupled between said gearbox and said second rotor assembly such that a first end of said first shaft extension is splined to a cone driving said second rotor assembly and such that a second end of said first shaft extension is splined to said gearbox.

20. A turbofan engine assembly in accordance with claim 11 further comprising a second shaft extension coupled between said gearbox and said fan assembly such that a first end of said second shaft extension is splined to said gearbox and such that a second end of said second shaft extension is splined to a drive shaft extension coupled between said drive shaft and said fan assembly.

* * * * *